(12) United States Patent
Miyazaki

(10) Patent No.: US 11,358,385 B2
(45) Date of Patent: Jun. 14, 2022

(54) IMAGE FORMING APPARATUS, IMAGE FORMING METHOD, AND IMAGE FORMING PROGRAM

(71) Applicant: Konica Minolta, Inc., Tokyo (JP)

(72) Inventor: Ken Miyazaki, Sagamihara (JP)

(73) Assignee: KONICA MINOLTA, INC., Tokyo (JP)

(*) Notice: Subject to any disclaimer, the term of this patent is extended or adjusted under 35 U.S.C. 154(b) by 157 days.

(21) Appl. No.: 16/939,276

(22) Filed: Jul. 27, 2020

(65) Prior Publication Data

US 2021/0070034 A1 Mar. 11, 2021

(30) Foreign Application Priority Data

Sep. 5, 2019 (JP) .............................. JP2019-162354

(51) Int. Cl.
*B41F 19/00* (2006.01)
*G06K 15/02* (2006.01)
*B44C 1/17* (2006.01)
*G06F 3/12* (2006.01)

(52) U.S. Cl.
CPC ........ *B41F 19/008* (2013.01); *G06K 15/1807* (2013.01); *B41P 2219/42* (2013.01); *B44C 1/1716* (2013.01); *B44C 1/1729* (2013.01); *G06F 3/1242* (2013.01)

(58) Field of Classification Search
CPC .. B41F 19/008; B41F 16/0006; B44C 1/1729; G06F 3/1242; G06F 3/1208; G06F 3/1282
See application file for complete search history.

(56) References Cited

U.S. PATENT DOCUMENTS

2016/0311245 A1* 10/2016 Belling ................ B44C 1/1716

FOREIGN PATENT DOCUMENTS

JP 2012135899 A 7/2012

* cited by examiner

*Primary Examiner* — King Y Poon
*Assistant Examiner* — Michael Burleson
(74) *Attorney, Agent, or Firm* — Buchanan Ingersoll & Rooney PC

(57) ABSTRACT

An image forming apparatus includes: an image former that prints a foil stamping image on a recording material in accordance with a job for printing the foil stamping image, the foil stamping image being a target to which foil is transferred in foil stamp printing; and a hardware processor that trims an image on a page identical to at least one page included in the job such that the image on the identical page does not overlap an image adjustment mark that is printed for adjusting an image to be overprinted, and causes the image former to print, together with the job, the identical page having the trimmed image.

9 Claims, 18 Drawing Sheets

ONE JOB = 100 COPIES COMPOSED OF THREE PAGES PER COPY

FIRST COPY   431

SECOND COPY

100TH COPY

DUPLICATE OF TARGET PAGE
(PAGE IN WHICH IMAGE DOES NOT OVERLAP MARK POSITIONS)  432

IMAGE FORMING APPARATUS, IMAGE FORMING METHOD, AND IMAGE FORMING PROGRAM

The entire disclosure of Japanese patent Application No. 2019-162354, filed on Sep. 5, 2019, is incorporated herein by reference in its entirety.

BACKGROUND

Technological Field

The present invention relates to an image forming apparatus, an image forming method, and an image forming program.

Description of the Related Art

A known technique for foil stamp printing involves heating and pressing a sheet having a toner image formed thereon, with foil placed over it, to transfer foil to the toner image. Foil stamping is a type of value-added printing for luxuriously decorating commercial materials, and is therefore applied to high-class items. After foil stamp printing, another technique may be used to form an additional image on the foil. Techniques for printing an additional image on a sheet that already has an image printed thereon is called overprinting.

When performing overprinting after foil stamping (hereinafter referred to as post-stamp overprinting), it is necessary to ensure that the overprinting image is not misaligned with the foil image. In post-stamp overprinting, even a slight misalignment between the foil image and the overprinting image can be significantly noticeable, making the printed matter inadequate for commercial use. This type of misalignment occurs during fixing operation for image formation, in which the sheet is exposed to heat to shrink.

To prevent misalignment between a foil image and an overprinting image, an image adjustment mark is printed on the sheet having the foil image stamped thereon, the position of the printed image adjustment mark is measured, and the image to be overprinted is corrected with reference to the position of the image adjustment mark such that it matches the position and size of the foil image.

The image adjustment mark can be a register mark. In some cases, however, register marks may overlap images when printed. Register marks can be difficult to read if they overlap images when printed. Especially in the case of foil stamp printing, register marks are printed on the foil, and the foil and the register marks overlap each other, making the register marks unreadable.

A conventional technique for improving the readability of register narks is exemplified by the technique disclosed in JP 2012-135899 A. In the technique disclosed in JP 2012-135899 A, in order to prevent a register mark for cutting and an output image from overlapping each other, the periphery of the register mark (cutting mark) of the output image is trimmed.

However, the intended purpose of the technique disclosed in JP 2012-135899 A is to make cutting register marks easy to see, in which no consideration is given to post-stamp overprinting.

SUMMARY

In view of this, an object of the present invention is to provide an image forming apparatus, an image forming method, and an image forming program for preventing an image adjustment mark for correcting an image for post-stamp overprinting from overlapping the foil-stamped image.

To achieve the abovementioned object, according to an aspect of the present invention, an image forming apparatus reflecting one aspect of the present invention comprises: an image former that prints a foil stamping image on a recording material in accordance with a job for printing the foil stamping image, the foil stamping image being a target to which foil is transferred in foil stamp printing; and a hardware processor that trims an image on a page identical to at least one page included in the job such that the image on the identical page does not overlap an image adjustment mark that is printed for adjusting an image to be overprinted, and causes the image former to print, together with the job, the identical page having the trimmed image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4 is an explanatory diagram for explaining an interface screen displayed on an operation display;

FIG. 9 is an explanatory diagram for explaining an interface screen for overprinting;

DETAILED DESCRIPTION OF EMBODIMENTS

Hereinafter, one or more embodiments of the present invention will be described with reference to the drawings. However, the scope of the invention is not limited to the disclosed embodiments. In the description of the drawings, identical elements are denoted by the same reference signs, and duplicate descriptions are omitted. The dimensional ratios of the drawings are exaggerated for convenience of explanation and may differ from the actual ones.

(Image Forming System)

Figure 1:
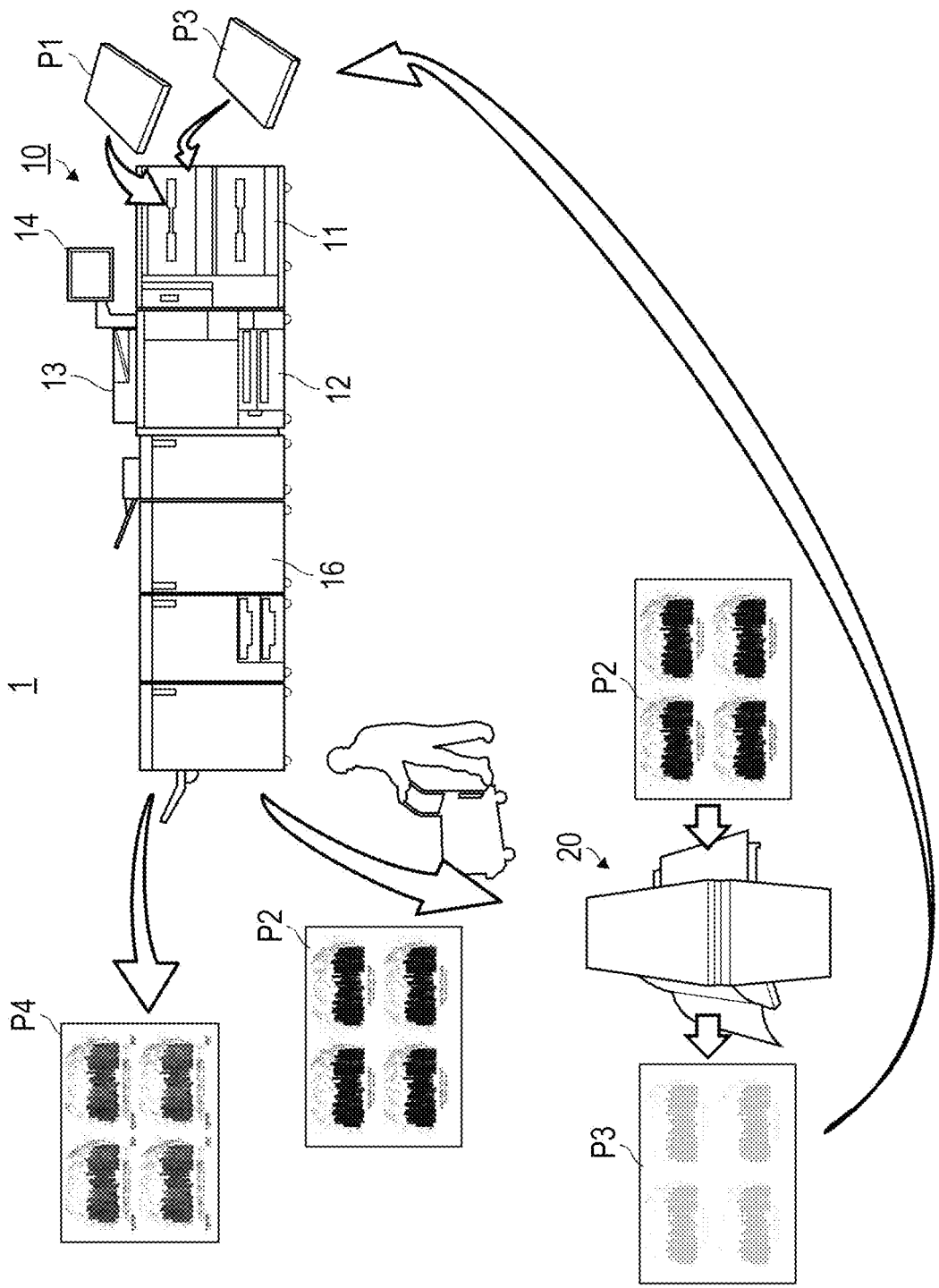
FIG. 1 is a schematic diagram illustrating a configuration of an image forming system according to an embodiment of the present invention.

FIG. 1 is a schematic diagram illustrating a configuration of an image forming system according to an embodiment of the present invention.

As illustrated in FIG. 1, the image forming system 1 includes an image forming apparatus 10 and a foil stamping apparatus 20.

The image forming apparatus 10 prints a toner image (hereinafter simply referred to as an image) on a sheet P1 which is a recording material, and outputs a printed matter P2 having the image formed thereon. The image formed on each sheet of the printed matter P2 is a target to which foil is transferred in foil stamp printing. The printed matter P2 is manually carried by a foil stamp printing operator and set in the foil stamping apparatus 20.

The foil stamping apparatus 20 heats and presses the printed matter P2, for example, with a roll of foil placed over it. The toner melted by heating and pressing acts as an adhesive to transfer foil to the image. The foil stamping apparatus 20 outputs a printed matter P3 having foil transferred thereon.

In this image forming system, an additional image is overprinted on the printed matter P3. For this purpose, the printed matter P3 is manually carried by an operator and set in the image forming apparatus 10. The image forming apparatus 10 overprints the image on the printed matter P3. The image forming apparatus 10 outputs a printed matter P4 having the additional image printed on the foil image.

In the present embodiment, the image forming apparatus 10 that performs overprinting is the same as the image forming apparatus 10 that prints an image for foil stamping (referred to as a foil stamping image). However, the image forming apparatus 10 that performs overprinting may be different from the image forming apparatus 10 that prints a foil stamping image.

(Image Forming Apparatus 10)

Figure 2:
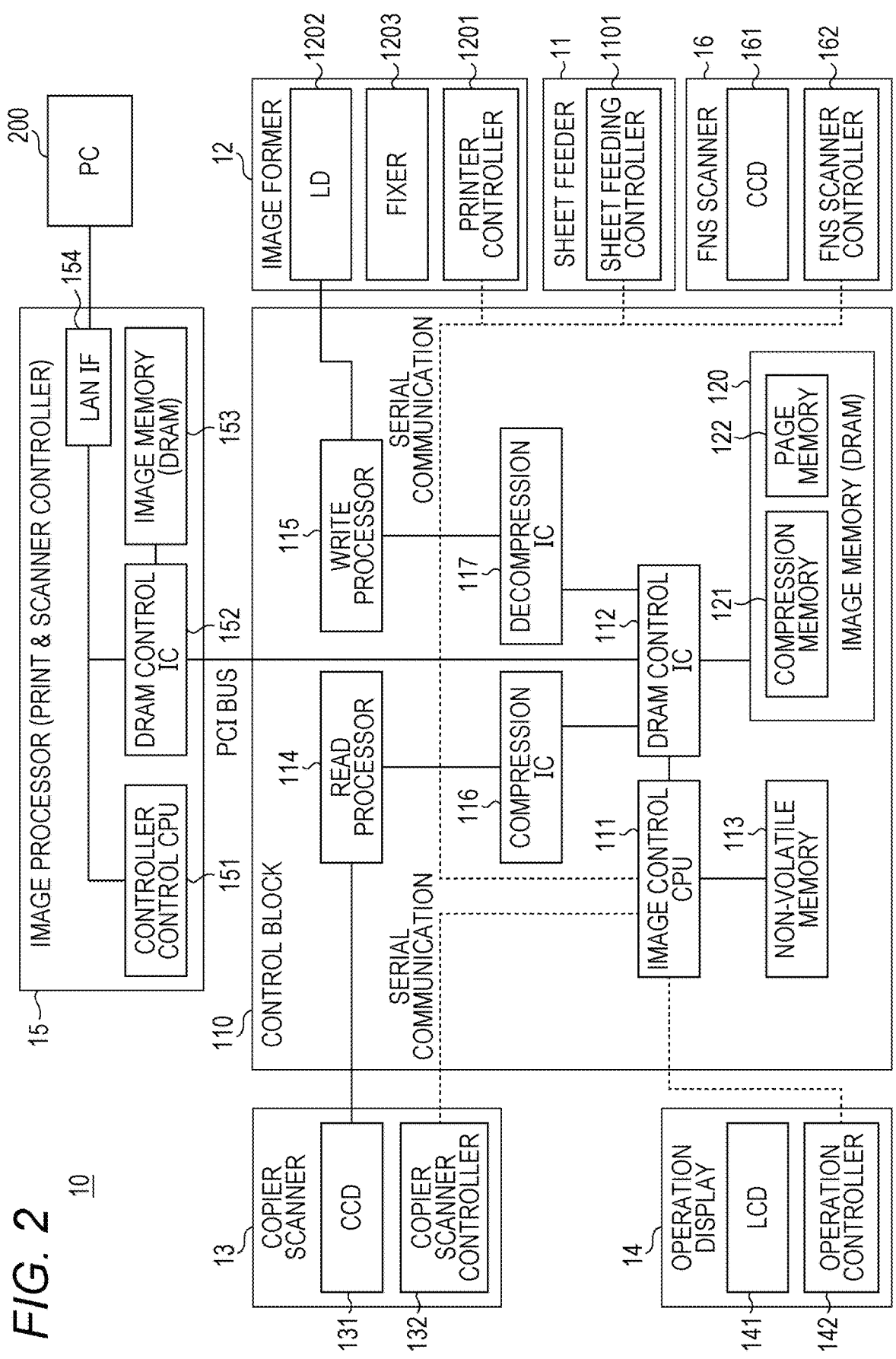
FIG. 2 is a block diagram for explaining the functions of an image forming apparatus.

FIG. 2 is a block diagram for explaining the functions of the image forming apparatus.

As illustrated in FIG. 1, the image forming apparatus 10 has a sheet feeder 11, an image former 12, a copier scanner 13, an operation display 14, and a finisher (FNS) scanner 16.

As illustrated in FIG. 2, the image forming apparatus 10 has an image processor 15 (print & scanner controller) and a control block 110. The control block 110 is a controller. The image processor 15 and the control block 110 are housed in the housing of the image former 12. The control block 110 may be a printer controller (not illustrated) provided separately from the image former 12 and the like.

Below is a description of each component.

In the present embodiment, the sheet feeder 11 stores cut sheets as sheets. The sheet feeder 11 has a sheet feeding controller 1101. The sheet feeding controller 1101 is connected to an image control central processing unit (CPU) 111 (described later) by serial communication and is controlled by the image control CPU 111. The sheet feeding controller 1101 supplies a sheet to the image former 12 in response to a command from the image control CPU 111.

The image former 12 forms (prints) an image on a sleet using electrophotography. The image former 12 has a printer controller 1201, a laser diode (LD) 1202, and a fixer 1203. The printer controller 1201 is connected to the image control CPU 111 by serial communication and is controlled by the image control CPU 111. The printer controller 1201 drives the LD 1202 using a signal from a write processor 115 (described later) to form an unfixed toner image on the sheet. The printer controller 1201 drives the fixer 1203 to heat and press the unfixed toner image formed on the sheet to fix the toner image.

The copier scanner 13 has an image sensor (CCD 131 in the figure) and a copier scanner controller 132. The image sensor is, for example, a charge coupled device (CCD) image sensor.

The copier scanner controller 132 is connected to the image control CPU 111 by serial communication and is controlled by the image control CPU 111. The copier scanner controller 132 transmits the image data read by the CCD 131 to a read processor 114 (described later).

The operation display 14 has a liquid crystal display (LCD 141 in the figure) and an operation controller 142. The LCD 141 is preferably equipped with a touch sensor, for example. Instead of a touch sensor, another key input device may be provided.

The operation controller 142 is connected to the image control CPU 111 by serial communication and is controlled by the image control CPU 111. The operation controller 142 receives input of settings related to image formation and operation commands from the touch sensor of the LCD 141. In the present embodiment, the operation controller 142 receives inputs such as foil stamp printing, overprinting, and overprinting adjustment. The input contents are sent from the operation controller 142 to the image control CPU 111 and stored in a non-volatile memory 113 or the like.

The image processor 15 processes image data that are input from or output to an external instrument 200. The external instrument 200 is, for example, a computer. The computer is a personal computer (PC), a tablet computer, a smartphone, or the like.

The image processor 15 has a controller control CPU 151, a dynamic random access memory (DRAM) control integrated circuit (IC) 152, an image memory 153, and a local area network interface (LAN IF) 154. In the image processor 15, the DRAM control IC 152 and the LAN IF 154 are connected to the controller control CPU 151.

The image memory 153 is connected to the DRAM control IC 152. The image memory 153 is a DRAM. The external instrument 200 is connected to the LAN IF 154 by wire or wirelessly. The wired or wireless connection is established via Ethernet (registered trademark), the Internet, or the like.

The image processor 15 transfers, to the DRAM control IC 152, the image data received from the external instrument 200 via the LAN IF 154. The DRAM control IC 152, under the control of the controller control CPU 151, temporarily stores the received image in the image memory 153. In the present embodiment, for example, an image for foil stamp printing, an image for overprinting, a register made image, etc. are received from the external instrument 200 and stored. A register mark image may be stored in advance in the non-volatile memory 113. In the present embodiment, a register mark serves as an image adjustment mark for adjusting an image to be printed during overprinting.

The FNS scanner 16 has an image sensor (CCD 161 in the figure) and an FNS scanner controller 162. The image sensor is, for example, a CCD line image sensor. The FNS scanner controller 162 is connected to the image control CPU 111 by serial communication and is controlled by the image control CPU 111. The FNS scanner controller 162 causes the CCD 161 to mad an image from the sheet that is being conveyed after printing by the image former 12. The FNS scanner controller 162 transmits the image read by the CCD 161 to the image control CPU 111.

In the present embodiment, the FNS scanner 16 reads the register mark printed on the sheet. If a register mark is printed on a foil image portion, the CCD 161 in the FNS scanner 16 is saturated by the gloss of the foil. Therefore, if a register mark is printed in a foil-stamped area, the FNS scanner 16 cannot read the register mark. The present embodiment prevents a foil image and a register mark from overlapping each other, so that the register mark can be read by the CCD 161. Note that the FNS scanner 16 is used not only for reading register marks but also for reading images printed by the image former 12 such as reading a color patch in color printing.

The control block 110 has ti image control CPU 111, a DRAM control IC 112, the non-volatile memory 113, the read processor 114, the write processor 115, a compression IC 116, a decompression IC 117, and an image memory 120.

The image control CPU 111 is connected to the sheet feeding controller 1101, the printer controller 1201, the copier scanner controller 132, the operation controller 142, and the FNS scanner controller 162 by serial communication.

The DRAM control IC 112 is connected to the image control CPU 111. The non-volatile memory 113 is connected to the image control CPU 111. The non-volatile memory 113 stores programs for image formation, setting data, parameters for image formation, and the like. In the present embodiment, an image forming program based on the printing procedures described later is also stored in the non-volatile memory 113. In addition, settings and the like input through the operation display 14 are also stored in the non-volatile memory 113.

The image control CPU 111 controls overall image processing. In the present embodiment, the image control CPU 111 executes image trimming, distance measurement between register marks read by the FNS scanner 16 and sheet edges, image adjustment based on measured values (also referred to as image correction), and the like. The image control CPU 111 also controls operations related to normal image formation (printing).

The DRAM control IC 112 is connected to the image memory 120. The image memory 120 is a DRAM. The image memory 120 is a storage area for image data, and stores image data of a job to be printed. In the image memory 120, areas for a compression memory 121 and a page memory 122 are secured. The image memory 120 stores image data acquired by the copier scanner 13 and image data acquired through the LAN IF 154. The DRAM control IC 112 also stores image data of a plurality of jobs in the image memory 120. The DRAM control IC 112 causes the image memory 120 to store image data of a plurality of reserved jobs.

The read processor 114 is connected to the DRAM control IC 112 via the compression IC 116 that compresses image data. The write processor 115 is connected to the DRAM control IC 112 via the decompression IC 117 that decompresses image data.

The DRAM control IC 112 is connected to the DRAM control IC 152 in the image processor 15 by a PCI bus or the like.

Image forming (printing) operation is performed as follows.

In the case of an image read by the copier scanner 13, the image is converted into digital image data by the read processor 114, further compressed by the compression IC 116, and passed to the DRAM control IC 112. The DRAM control IC 112 stores the compressed image data in the compression memory 121 of the image memory 120.

The DRAM control IC 112 reads the image data stored in the compression memory 121, causes the decompression IC 117 to decompress the image data, and passes the image data to the write processor 115. The write processor 115 drives the LD 1202 on the basis of the decompressed image data. At this time, the sheet feeding controller 1101 and the printer controller 1201 supply and convey a sheet at a predetermined timing, form an unfixed toner image on the sheet, and cause the fixer 1203 to heat and press the sheet, whereby the image is formed.

Further, in the case of image data received from the external instrument 200, the DRAM control IC 152 in the image processor 15 reads the temporarily stored image data from the image memory 153 and passes the image data to the DRAM control IC 112. The DRAM control IC 112 receives the image data from the DRAM control IC 152 and stores the image data in the compression memory 121 or the page memory 122.

The DRAM control IC 112 reads the image data from the image memory 120 and passes the image data to the write processor 115 via the decompression IC 117. Then, the image is formed in the same manner as the image read by the copier scanner 13 mentioned above.

(Processing)

Next, the processes of foil stamp printing and post-stamp overprinting will be described.

Figure 3:
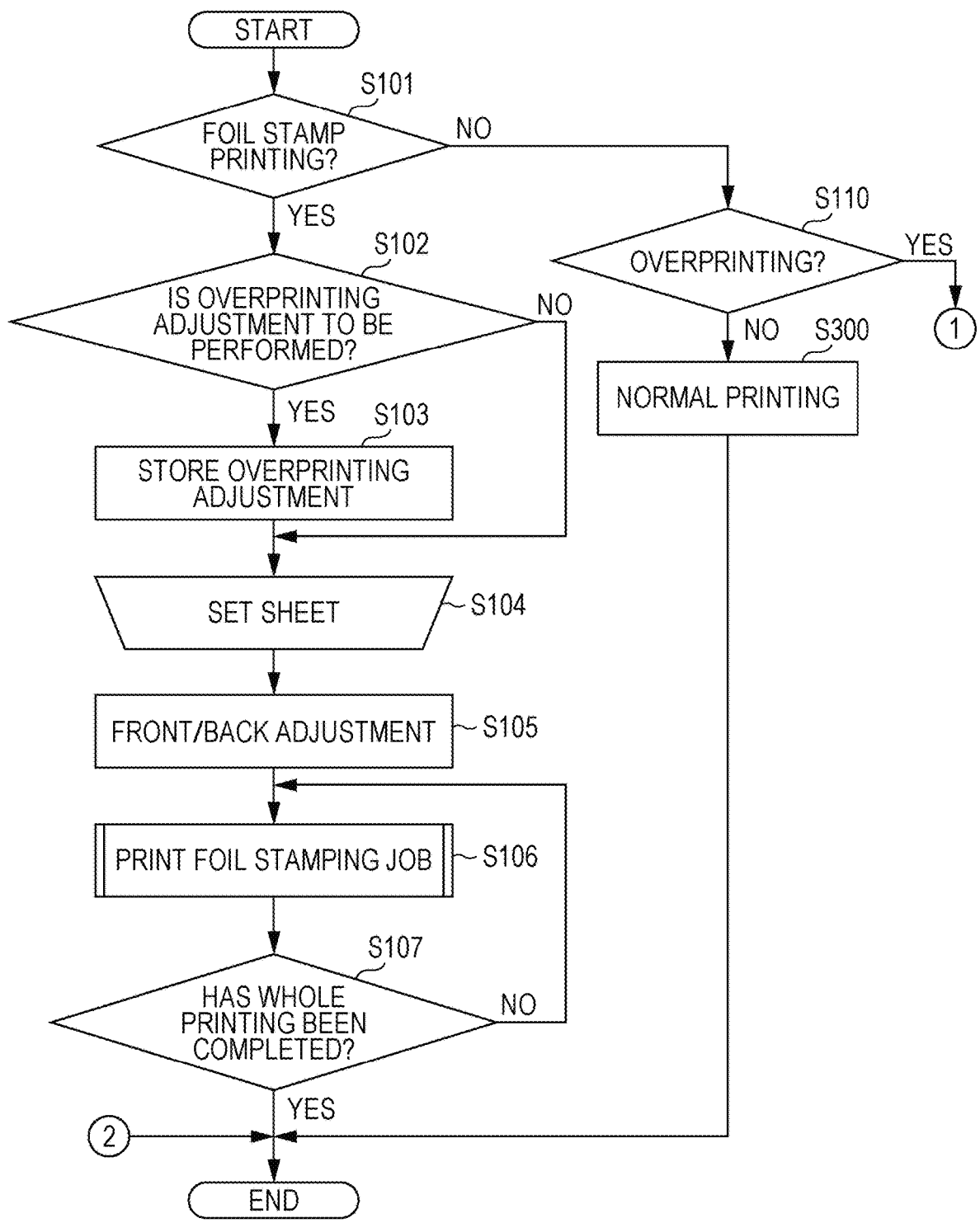
FIG. 3 is a flowchart of a main routine illustrating the procedure for foil stamp printing and post-stamp overprinting by the image forming apparatus.

FIG. 3 is a flowchart of a main routine illustrating the procedure for foil stamp printing and post-stamp overprinting by the image forming apparatus. The processes of foil stamp printing and post-stamp overprinting are performed by the image control CPU 111 executing an image forming program created on the basis of the procedures described below.

The image control CPU 111 first determines whether a command for foil stamp printing has been input (S101).

Figure 4:
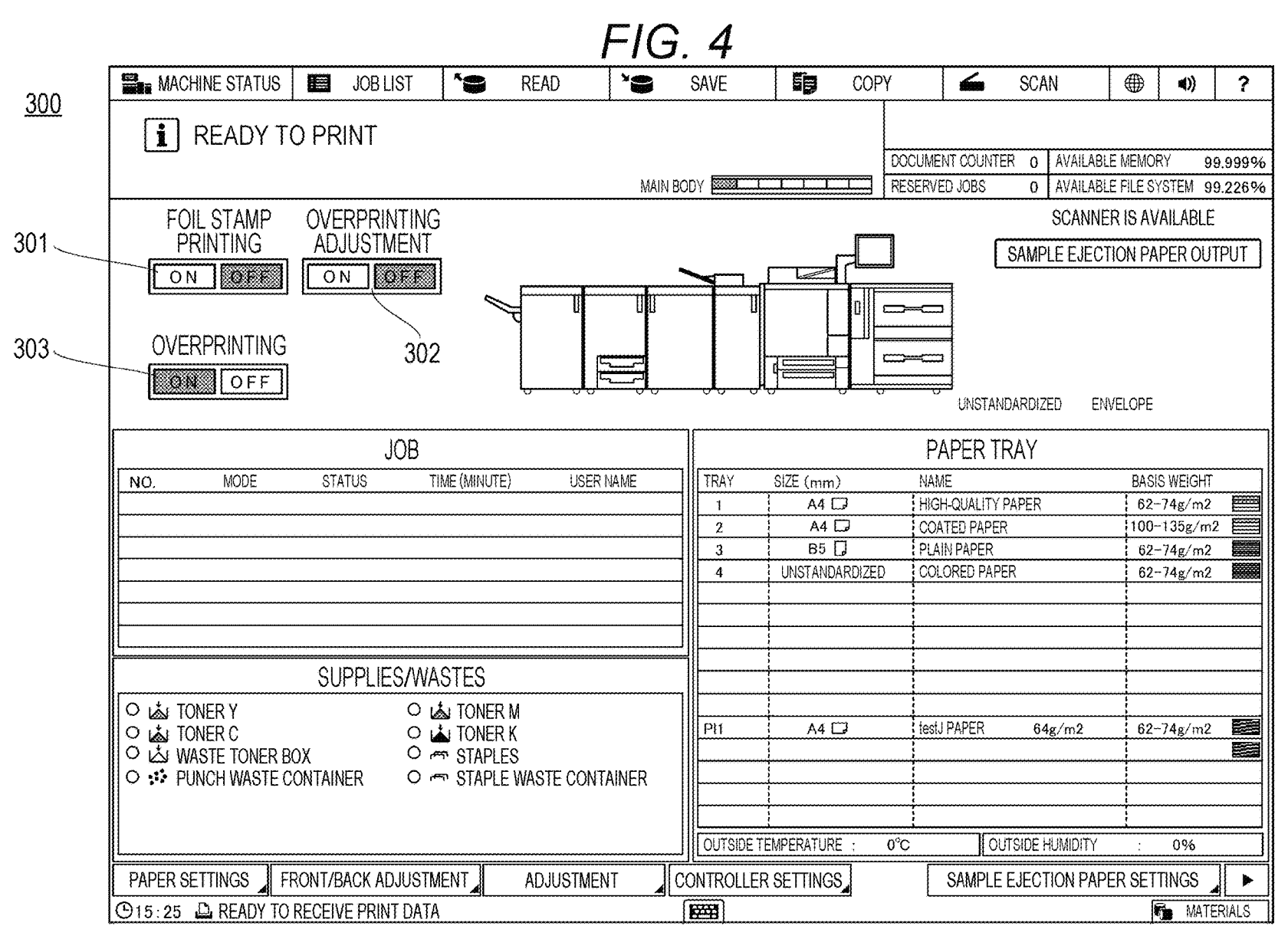

A command for foil stamp printing is input through the operation display 14. FIG. 4 is an explanatory diagram for explaining an interface screen displayed on the operation display. The interface screen 300 displayed on the operation display 14 contains a foil stamp printing switch 301, an overprinting adjustment switch 302, and an overprinting switch 303, as illustrated in FIG. 4.

The foil stamp printing switch 301 is an on-screen switch which is switched by the user. The foil stamp printing switch 301 is turned ON when foil stamp printing is to be performed, and turned OFF when foil stamp printing is not to be performed.

The overprinting adjustment switch 302 is an on-screen switch which is switched by the user. The overprinting adjustment switch 302 is turned ON when adjustment for post-stamp overprinting is to be performed, and turned OFF when adjustment is not to be performed.

The overprinting switch 303 is an on-screen switch which is switched by the user. The overprinting switch 303 is turned ON when overprinting is to be performed, and turned OFF when overprinting is not to be performed.

In the present embodiment, post-stamp overprinting is performed. In addition, post-stamp overprinting adjustment is set. Therefore, before the execution of foil stamp printing, the interface screen 300 is in the state illustrated in FIG. 4, i.e. the foil stamp printing switch 301 is ON, the overprinting adjustment switch 302 is ON, and the overprinting switch 303 is OFF.

Figure 5:
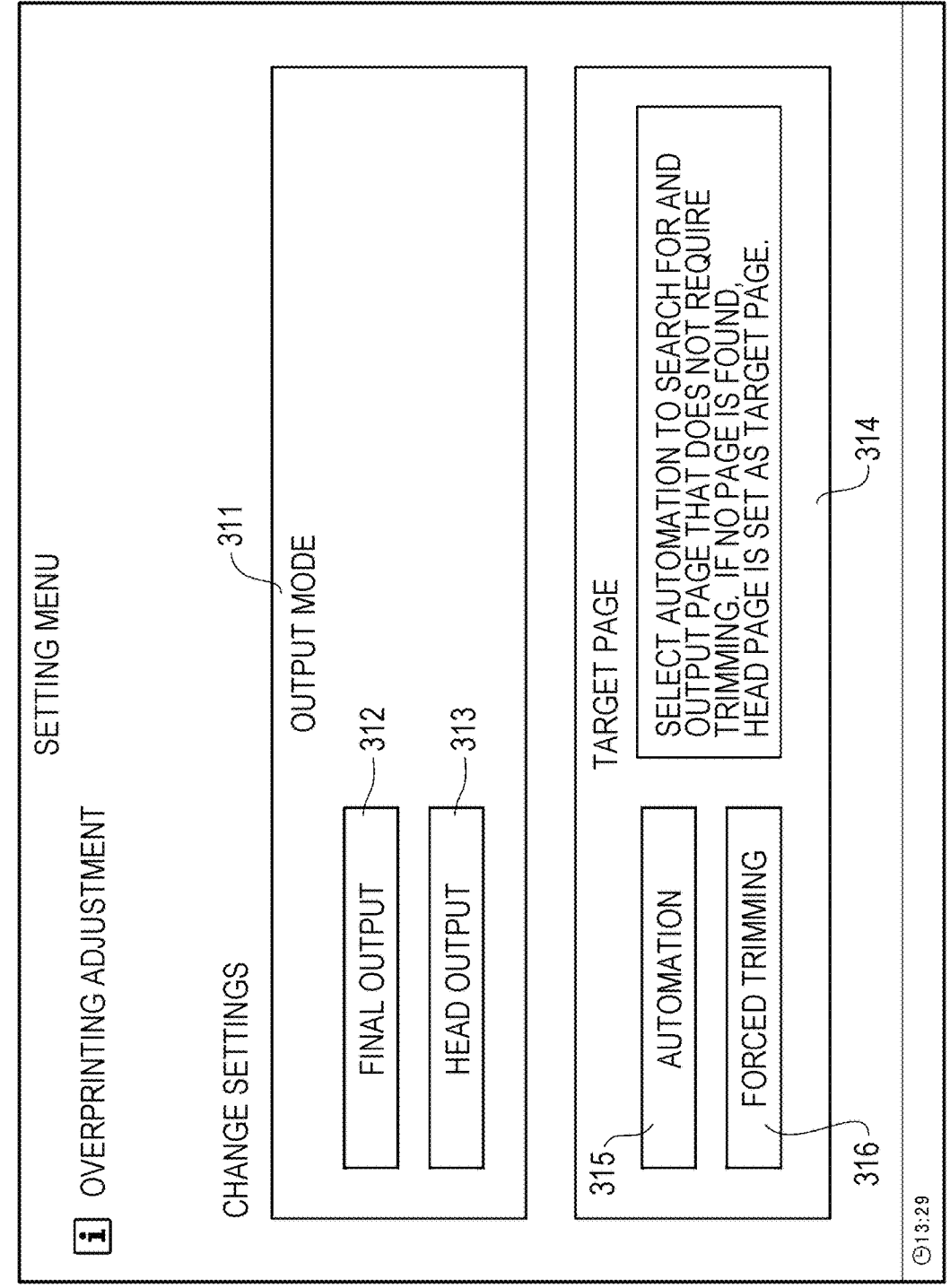
FIG. 5 is an explanatory diagram for explaining an overprinting adjustment screen displayed on the operation display.

FIG. 5 is an explanatory diagram for explaining an overprinting adjustment screen displayed on the operation display. The overprinting adjustment screen 310 displayed on the operation display 14 contains an output mode field 311 for designating the output position of the trimmed page. The output mode field 311 includes a final output button 312 for outputting the trimmed page at the end of the job and a head output button 313 for outputting the trimmed page at the head of the job. The overprinting adjustment screen 310 further contains a target page field 314 for selecting a target page for trimming. The target page field 314 includes an automation button 315 for automatically selecting a page to be trimmed and a forced trimming button 316 for forcibly setting a page to be trimmed. When the automation button 315 is selected, a page that does not require trimming (details will be described later) is searched for in the job, and in the absence of such a page, the first page is set as a trimming target page. When the forced trimming button 316 is selected, a page number input screen (not illustrated) is further displayed. The page with the number input on the page input screen is set as a target page for trimming.

When it is determined in S101 that foil stamp printing is to be performed (S101: YES), the image control CPU 111 then determines whether to perform post-stamp overprinting adjustment (S102). In the present embodiment, overprinting adjustment is performed. Therefore, the overprinting adjustment switch 302 is ON in FIG. 4 described above. Thus, it is determined that post-stamp overprinting adjustment is to be performed (S102: YES), and therefore the image control CPU 111 stores the contents of the overprinting adjustment (S103). If it is determined in S IOI that foil stamp printing is not to be performed (S101: NO), the image control CPU 111 proceeds to step S110. If it is determined in S110 that overprinting is not to be performed (S110: NO), it means that neither foil stamp printing nor overprinting is to be performed. Therefore, the image control CPU 111 performs normal printing (S300) and ends this procedure.

If it is determined in S102 that post-stamp overprinting adjustment is not to be performed (S102: NO), the image control CPU 111 proceeds to step S104.

After the overprinting adjustment is stored, a sheet is set by the user (S104).

Once a sheet is set, the image control CPU 111 performs front/back adjustment (S105). The front/back adjustment is performed for printing on the front and back of one sheet so that the positions of ti images printed on the front and back are aligned.

Next, the image control CPU 111 causes a foil stamping image to be printed according to a job for printing the foil stamping image (referred to as a foil stamping job) (S106). The printing procedure for a foil stamping job will be described later.

Next, the image control CPU 111 determines whether the whole printing has been completed (S107), and if not completed (S107: NO), returns to S106 to continue the printing process. On completion of the whole printing (S107: YES), the image control CPU 111 ends this procedure.

Figure 6:
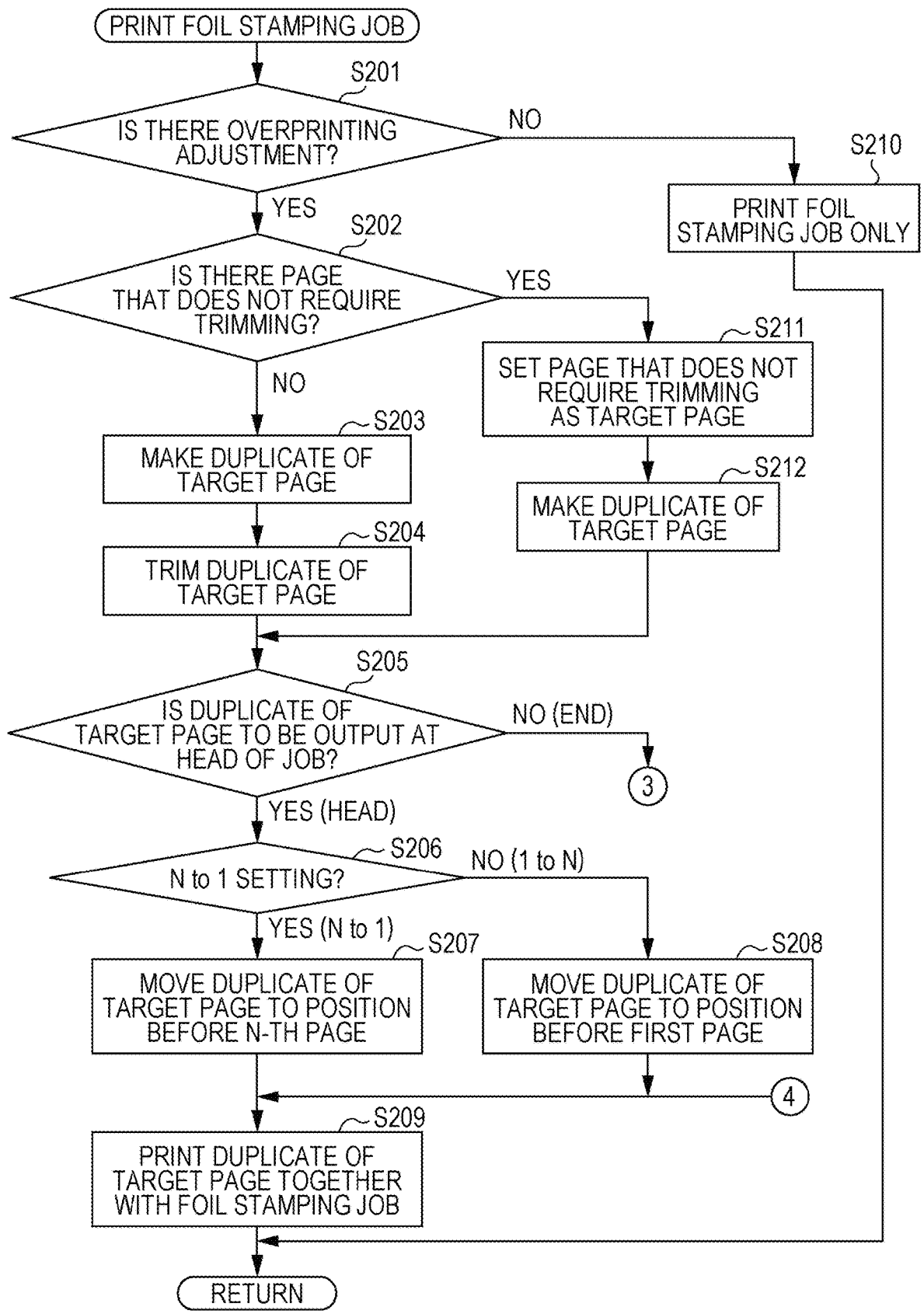
FIG. 6 is a flowchart of a subroutine illustrating the procedure for printing a foil stamping job.
Figure 7:
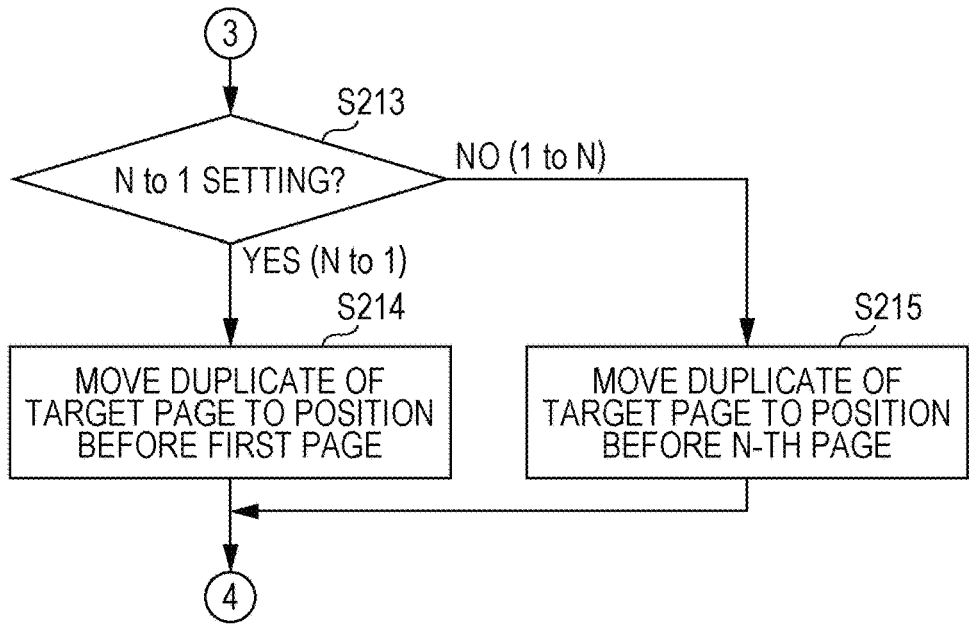
FIG. 7 is a flowchart of a subroutine illustrating the procedure for printing a foil stamping job.

The procedure for printing a foil stamping job will be described. FIGS. 6 and 7 are flowcharts of a subroutine illustrating the procedure for printing a foil stamping job.

The image control CPU 111 determines whether there is an overprinting adjustment (S201). When there is no overprinting adjustment (S201: NO), the image control CPU 111 directly prints the foil stamping job (S210), and returns to the main routine.

When them is an overprinting adjustment (S201: YES), the image control CPU 111 then determines whether them is a page that does not require trimming (S202). When there is a page that does not require trimming (S202: YES), the image control CPU 111 sets this page as a target page (S211) and makes a duplicate of the target page (S212). After that the image control CPU 111 proceeds to S205.

When there is no page that does not require trimming (S202: NO), the image control CPU 111 makes a duplicate of the target page (S203). As the target page for this step, the first page in the job is selected in the case of automatic trimming, or the designated page is selected in the case of forced trimming, in the manner already described.

Next, the image control CPU 111 trims the image in the duplicate of the target page (S204).

Next, the image control CPU 111 determines whether to output the duplicate of the target page at the head of the job (S205). Whether to output the duplicate of the target page at the head of the job has been stored as the overprinting adjustment, in the manner already described. When it is determined from the stored overprinting adjustment that the duplicate of the target page is to be output at the head (S205: YES), the image control CPU 111 then determines whether the output order is from the final (N-th) page to the first page (N to 1) (S206). When it is determined that the output order is N to 1 (S206: YES), the image control CPU 111 moves the duplicate of the target page such that the duplicate is printed before the N-th page (S207). In contrast, when it is determined that the output order is 1 to N (S206: NO), the image control CPU 111 moves the duplicate of the target page such that the duplicate is printed before the first page (S208). Next, the image control CPU 111 causes the duplicate of the target page to be printed together with the foil stamping job (S209).

In S205, when it is determined from the stored overprinting adjustment that the duplicate of the target page is to be output at the end (S205: NO), the image control CPU 111 then determines whether the output order is from the final (N-th) page to the first page (N to 1) (S213). When it is determined that the output order is N to 1 (S213: YES), the image control CPU 111 moves the duplicate of the target page such that the duplicate is printed before the N-th page (S214). In contrast, when it is determined that the output order is 1 to N (S213: NO), the image control CPU 111 moves the duplicate of the target page such that the duplicate is printed before the first page (S215). Next, the image control CPU 111 causes the duplicate of the target page to be printed together with the foil stamping job (S209).

Through these processes, in the present embodiment, a page identical to a page in the foil stamping job is printed out, together with the job, as a target page at the head or end of the job. The printed-out page is a page that does not require trimming or a page in which the image has been trimmed such that the image does not overlap register marks.

The printed matter P2 printed in the foil stamping job is carried to the foil stamping apparatus 20 and subjected to foil stamping.

Figure 8:
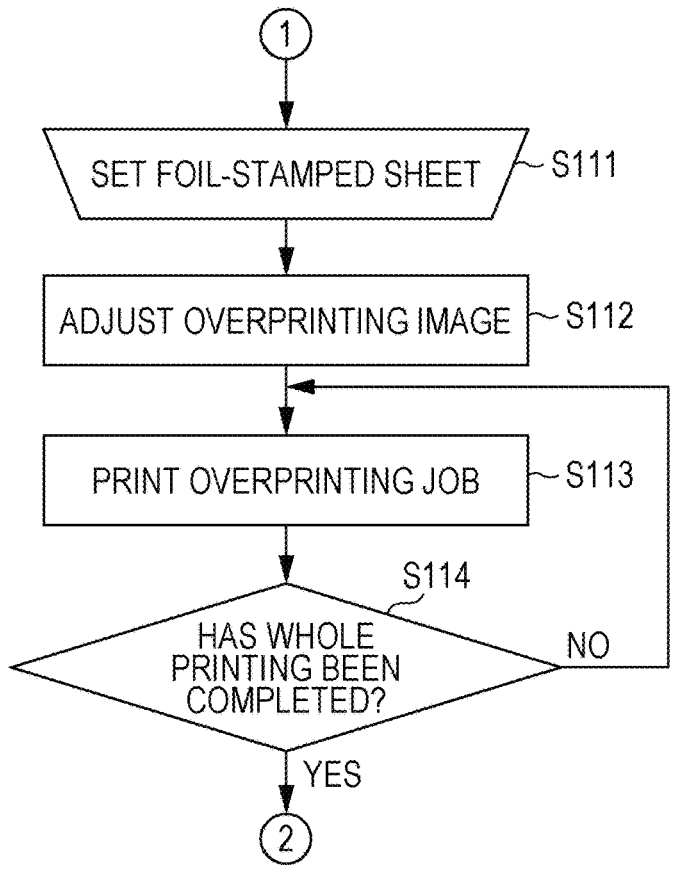
FIG. 8 is a flowchart illustrating the procedure for overprinting following FIG. 3.

The foil-stamped sheet (printed matter P3) is returned to the image forming apparatus 10 and subjected to overprinting. FIG. 8 is a flowchart illustrating the procedure for overprinting following FIG. 3.

Figure 9:
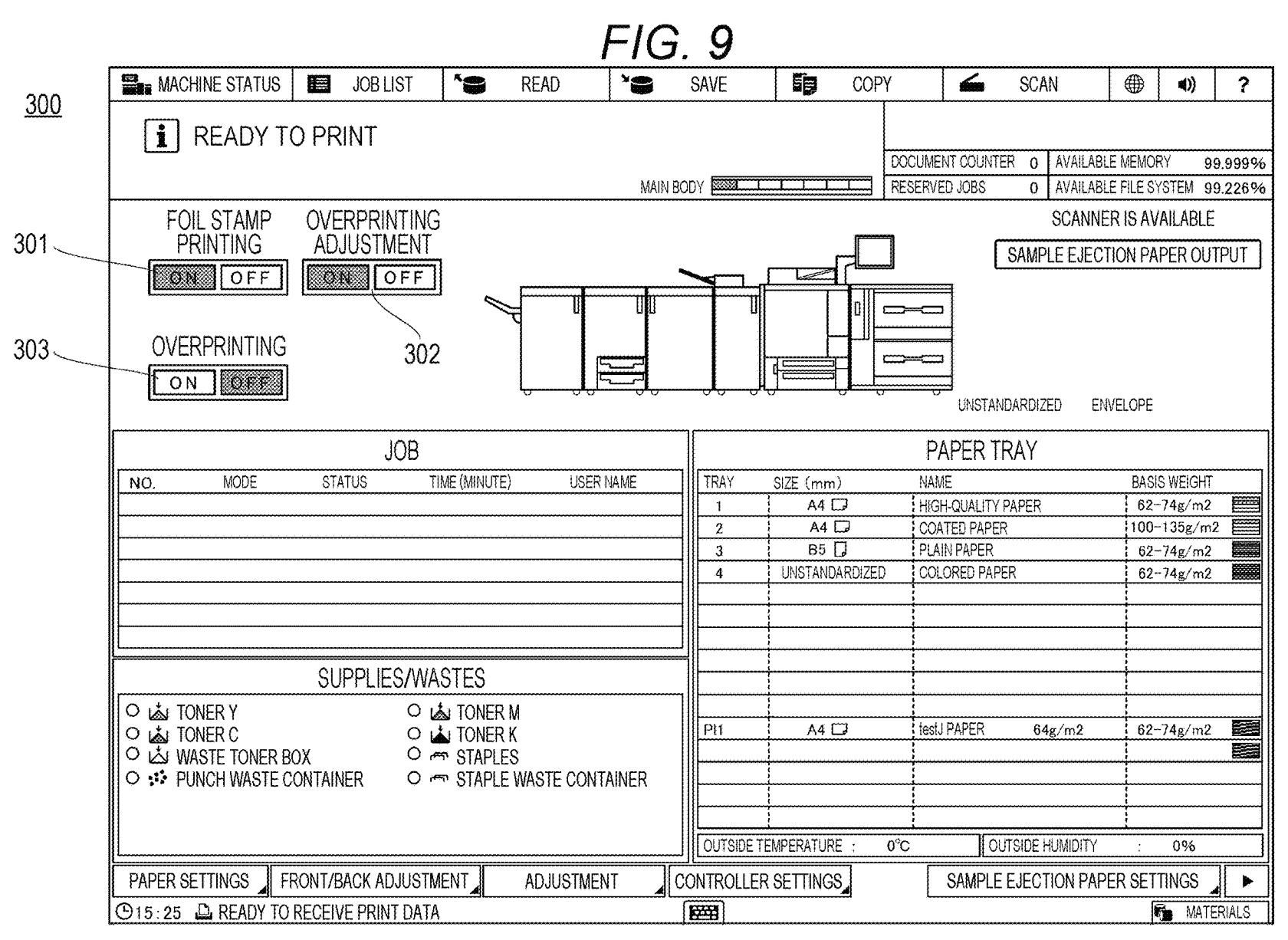

For performing post-stamp overprinting, a command for overprinting is input through the interface screen 300. FIG. 9 is an explanatory diagram for explaining an interface screen for overprinting. For performing overprinting, on the interface screen 300, the foil stamp printing switch 301 is turned OFF, the overprinting adjustment switch 302 is turned OFF, and the overprinting switch 303 is turned ON.

When it is determined in S110 illustrated in FIG. 3 that overprinting is to be performed (S10: YES), then, the foil-stamped sheet (printed matter P3) is set in the image forming apparatus 10 by the user as illustrated in FIG. 8 (S111).

Next, the image control CPU 111 adjusts the overprinting image (S112). In the adjustment of the overprinting image, a register mark is printed on the sheet of the target page printed together with the foil stamping job. The register mark is read by the FNS scanner 16, and the position and size of the image to be overprinted are adjusted with reference to the position of the register mark. The adjustment of the position of the image involves, for example, adjusting the write position of the image to be overprinted in accordance with the position of the register mark from the sheet edge. The adjustment of the size of the image involves, for example, enlarging or reducing the image to be overprinted in accordance with the distance between ti register mark and the sheet edge.

Next, the image control CPU 111 causes the overprinting image to be printed in accordance with the job for printing the overprinting image (referred to as the overprinting job) (S113). After that, the image control CPU 111 determines whether the whole printing has been completed (S114), and if not completed (S114: NO), returns to S113 to continue the process. On completion of the whole printing (S114: YES), the image control CPU 111 ends this procedure.

In the procedures described above, a page in which a foil stamping image does not overlap register marks is searched for. Alternatively, a predetermined page or an input page may be trimmed without performing this search process.

(Action and Effect)

The action and effect of the embodiment will be described.

First, misalignment between a foil image formed by foil stamping and an overprinting image printed on the foil image will be described.

Figure 10:
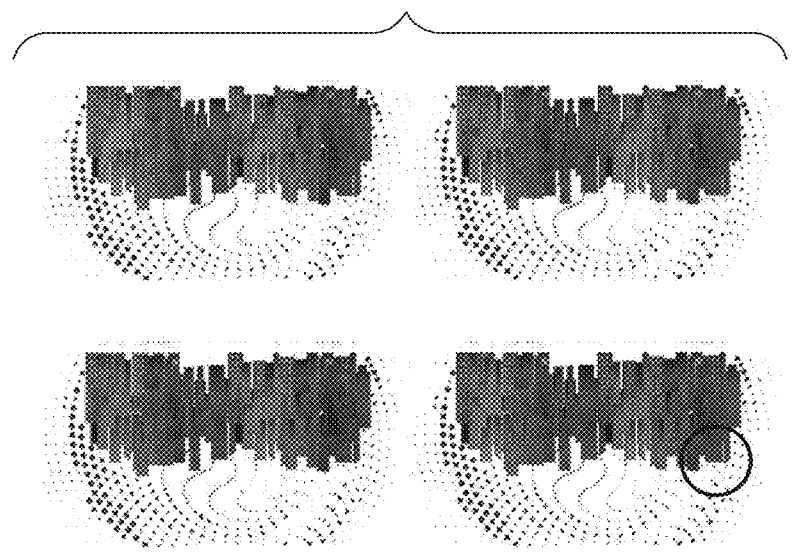
FIG. 10 is a plan view of a printed matter having a foil image and an overprinting image formed thereon.
Figure 11:
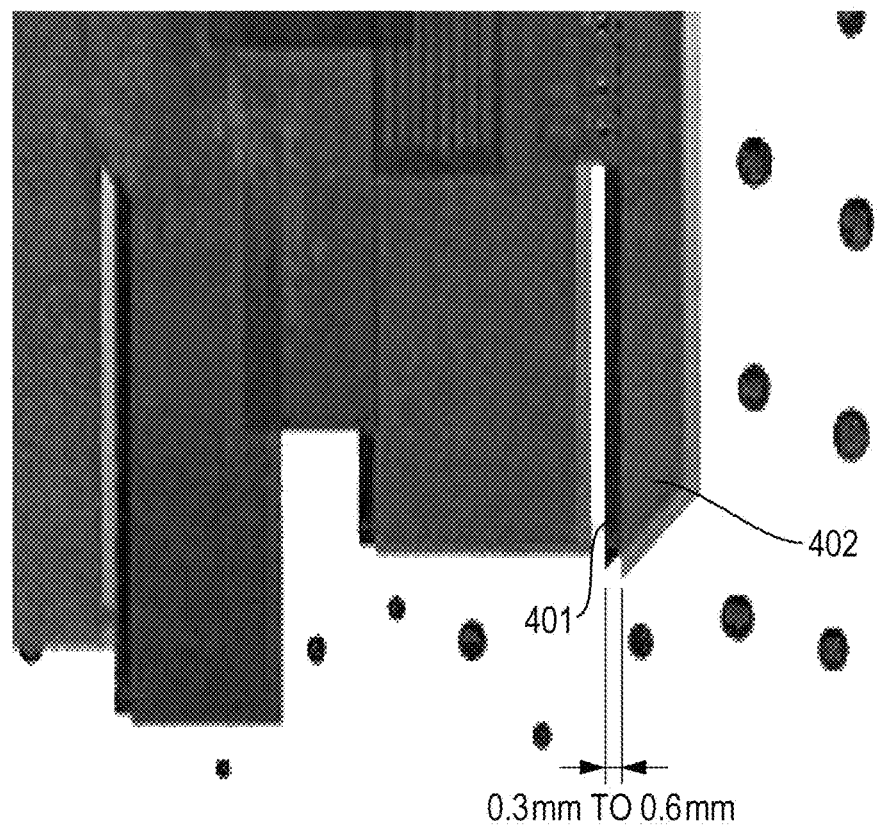
FIG. 11 is an enlarged view of the circled part in FIG. 10.

FIG. 10 is a plan view of a printed matter having a foil image and an overprinting image formed thereon. FIG. 11 is an enlarged view of the circled part in FIG. 10.

In post-stamp overprinting, the overprinting image 402 is formed on the foil image 401 as illustrated in FIGS. 10 and 11. In this example, as illustrated in FIG. 11, the overprinting image 402 is misaligned with the foil image 401 by 0.3 to 0.6 mm. This type of misalignment between images is caused by shrinkage of the sheet. The sheet is exposed to heat during printing of the foil stamping image and during foil stamping by the foil stamping apparatus 20. Therefore, the sheet shrinks due to the heat received.

Figure 12:
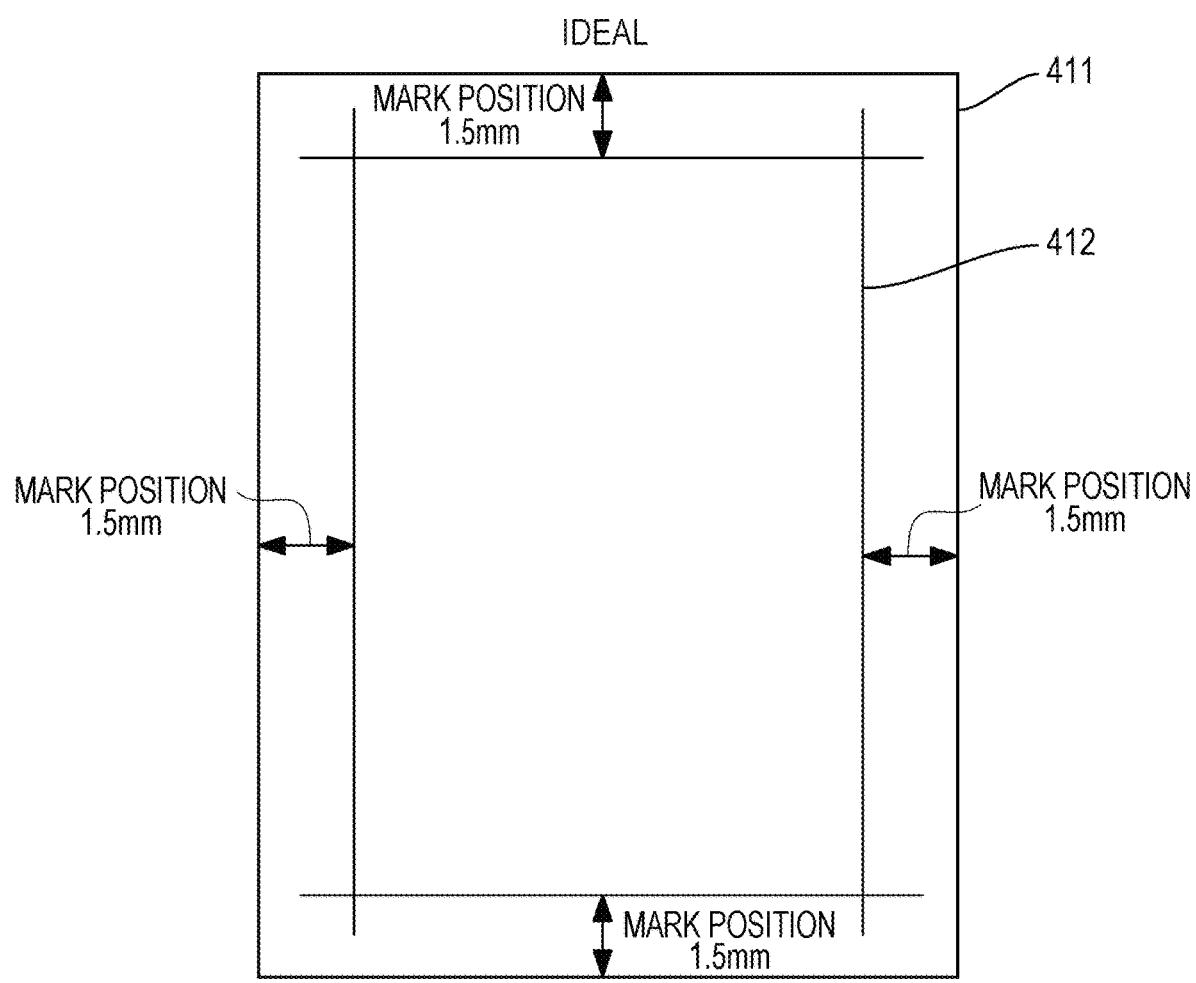
FIG. 12 is a plan view illustrating the ideal state of a sheet having register marks printed thereon.
Figure 13:
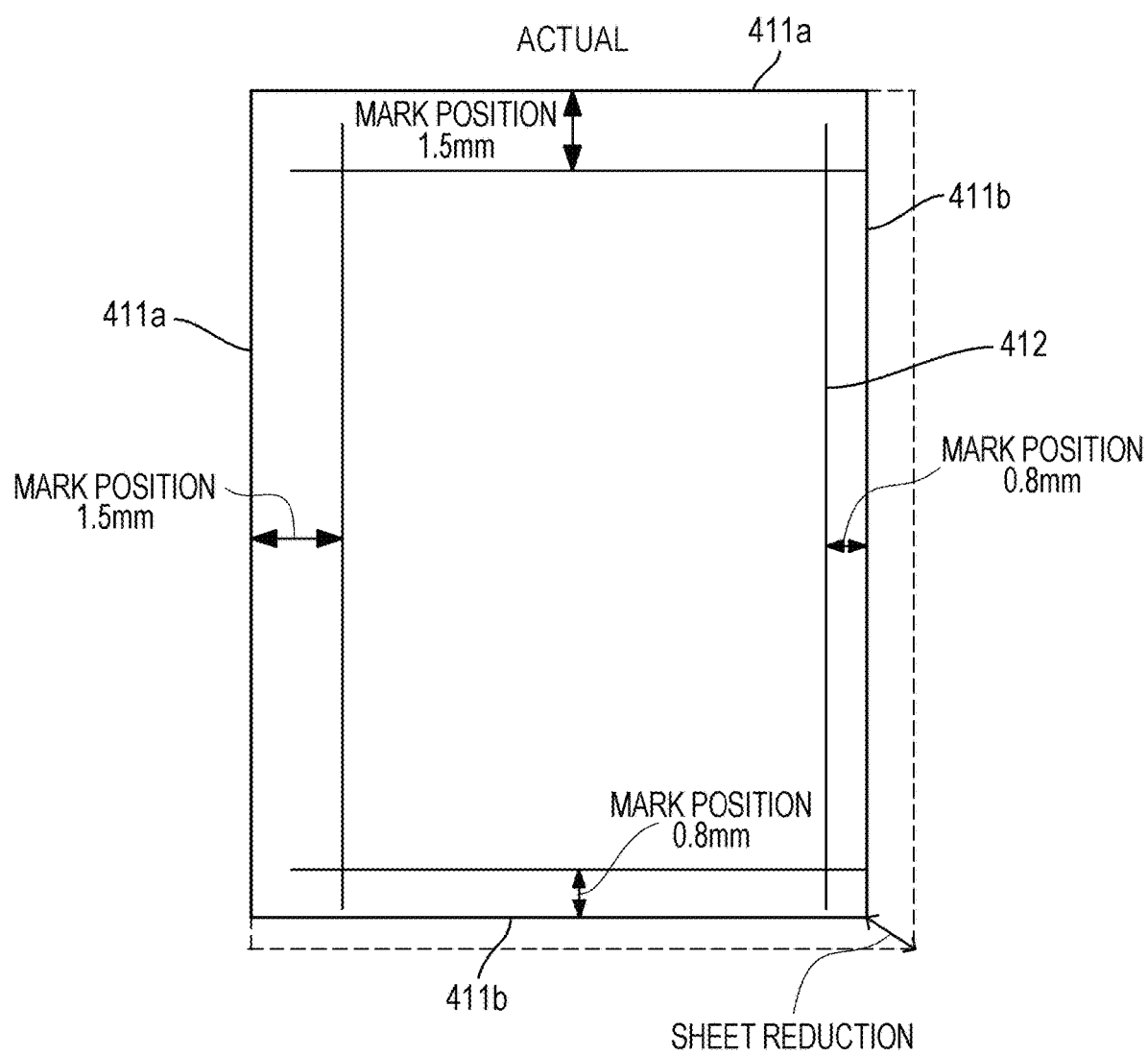
FIG. 13 is a plan view illustrating the actual state of a sheet having register marks printed thereon.

This type of image misalignment caused by shrinkage of the sheet can be prevented by adjustment using register marks. FIG. 12 is a plan view illustrating the ideal state of a sheet having register marks printed thereon. FIG. 13 is a plan view illustrating the actual state of a sheet having register marks printed thereon.

In the ideal case where the sheet is not shrunk, the register marks 412 printed on the sheet are at a constant distance from sheet edges 411, as illustrated in FIG. 12. In the example illustrated in FIG. 12, the register narks 412 are printed at a distance of 1.5 mm from the sheet edges 411 on the respective sides of the sheet.

Actually, however, the sleet having the foil stamping image printed thereon (not illustrated in FIGS. 12 and 13) is shrunk. For this reason, as illustrated in FIG. 13, when the register marks 412 identical to those in FIG. 12 are printed on the sheet having the foil stamping image printed thereon, the register marks 412 on two sides are at a distance of 1.5 mm from sheet edges 411a, whereas the register marks 412 on the other two sides are at a distance of 0.8 mm from sheet edges 411b. This is because the register marks 412 are printed on the shrunk sheet, and thus the positions of the sheet edges 411 and the register marks 412 deviate from the ideal ones.

The shrinkage of the sleet can be detected by printing the predetermined register marks 412 on the foil-stamped sheet and measuring the distances between the register marks 412 and the sheet edges 411. Specifically, for example, the ideal distances between the register marks 412 and the sheet edges 411 on the four sides are stored in advance. Then, the register marks 412 of the same size are printed on the sheet having the foil stamping image printed thereon (or the foil-stamped sheet), and the distances from the sheet edges 411 on the four sides of the sheet are measured. By comparing the measured values with the ideal values, the shrinkage amount of the sheet can be determined. The register marks 412 and the sheet edges 411 are read by the FNS scanner 16, and the distances therebetween are measured.

Figure 14:
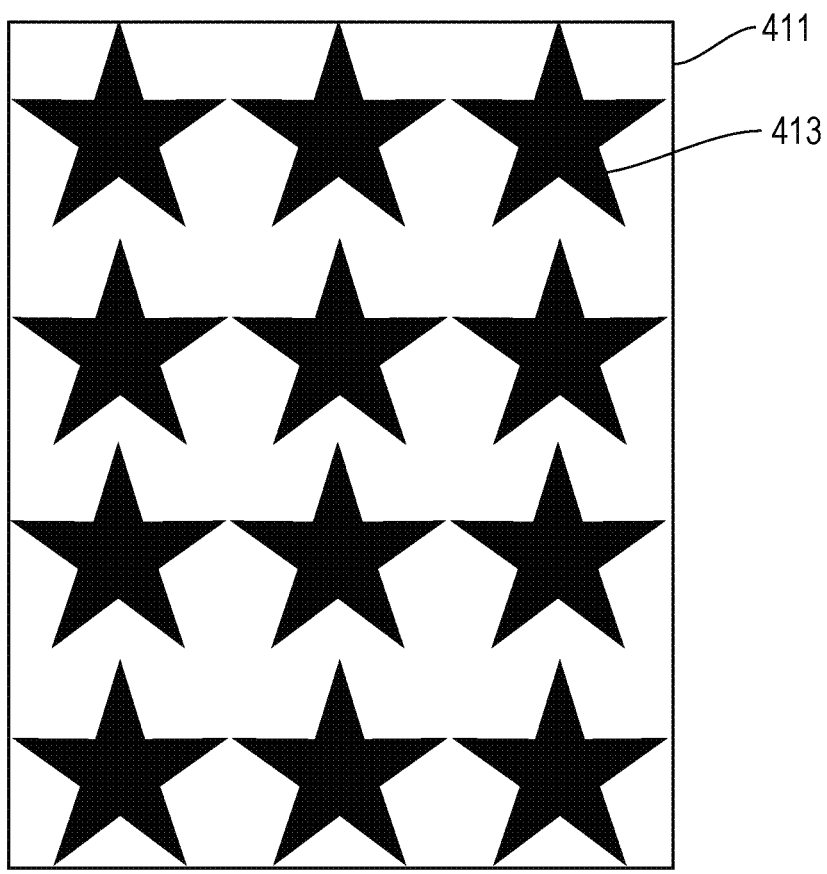
FIG. 14 is a plan view of a sheet having a foil stamping image printed up to the sheet edges.
Figure 15:
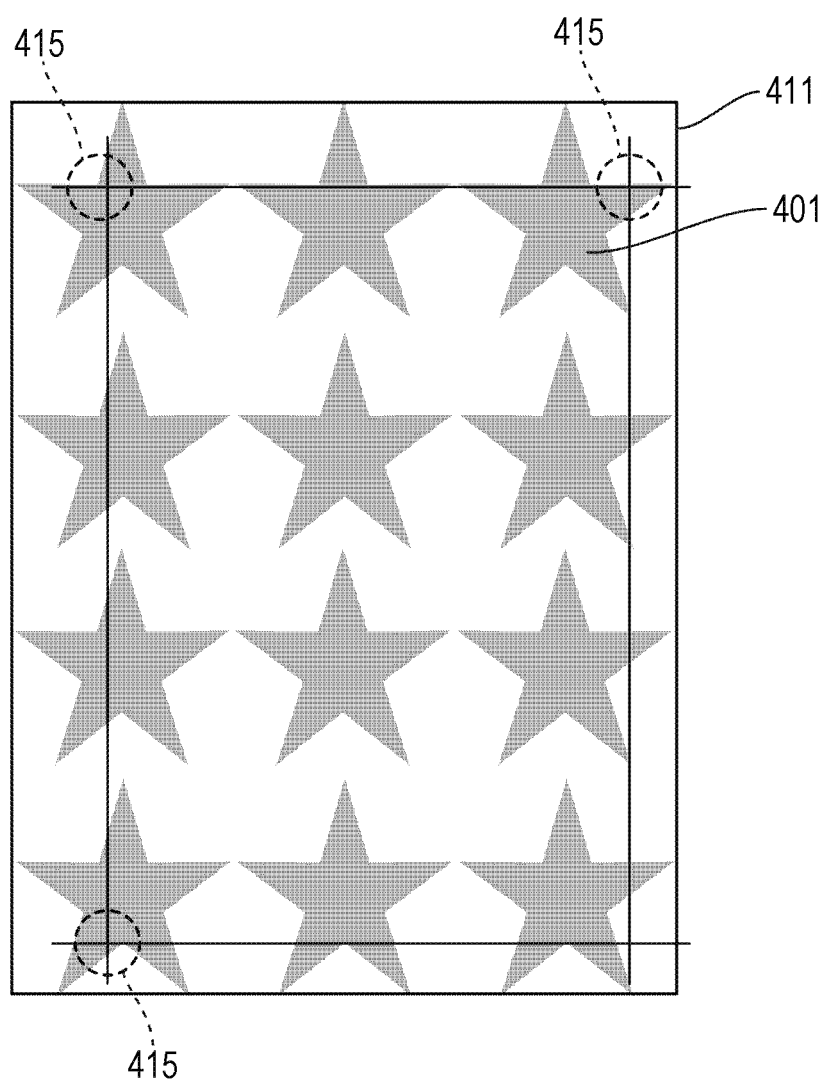
FIG. 15 is a plan view of ti sheet having the foil stamping image printed as illustrated in FIG. 14, on which foil stamping is performed and then register marks are printed.

FIG. 14 is a plan view of a sheet having a foil stamping image printed up to the sheet edges. FIG. 15 is a plan view of the sheet having the foil stamping image printed as illustrated in FIG. 14, on which foil stamping is performed and then register narks are printed.

As illustrated in FIG. 14, the foil stamping image 413 is a foil stamping image of the type that is drawn up to the sheet edges 411 or to positions close to the sheet edges 411. When this type of foil stamping image 413 is subjected to foil stamping, the foil image 401 is naturally formed up to the sheet edges 411 or to positions close to the sheet edges 411, as illustrated in FIG. 15.

When the register marks 412 are printed on this foil-stamped sheet, the register marks 412 overlap the foil image 401 as indicated by dashed circles 415 in FIG. 15 and cannot be read by the FNS scanner 16.

In view of this, in the present embodiment, the foil stamping image is trimmed so that the register marks 412 are not printed in the area having a printed image.

Figure 16:
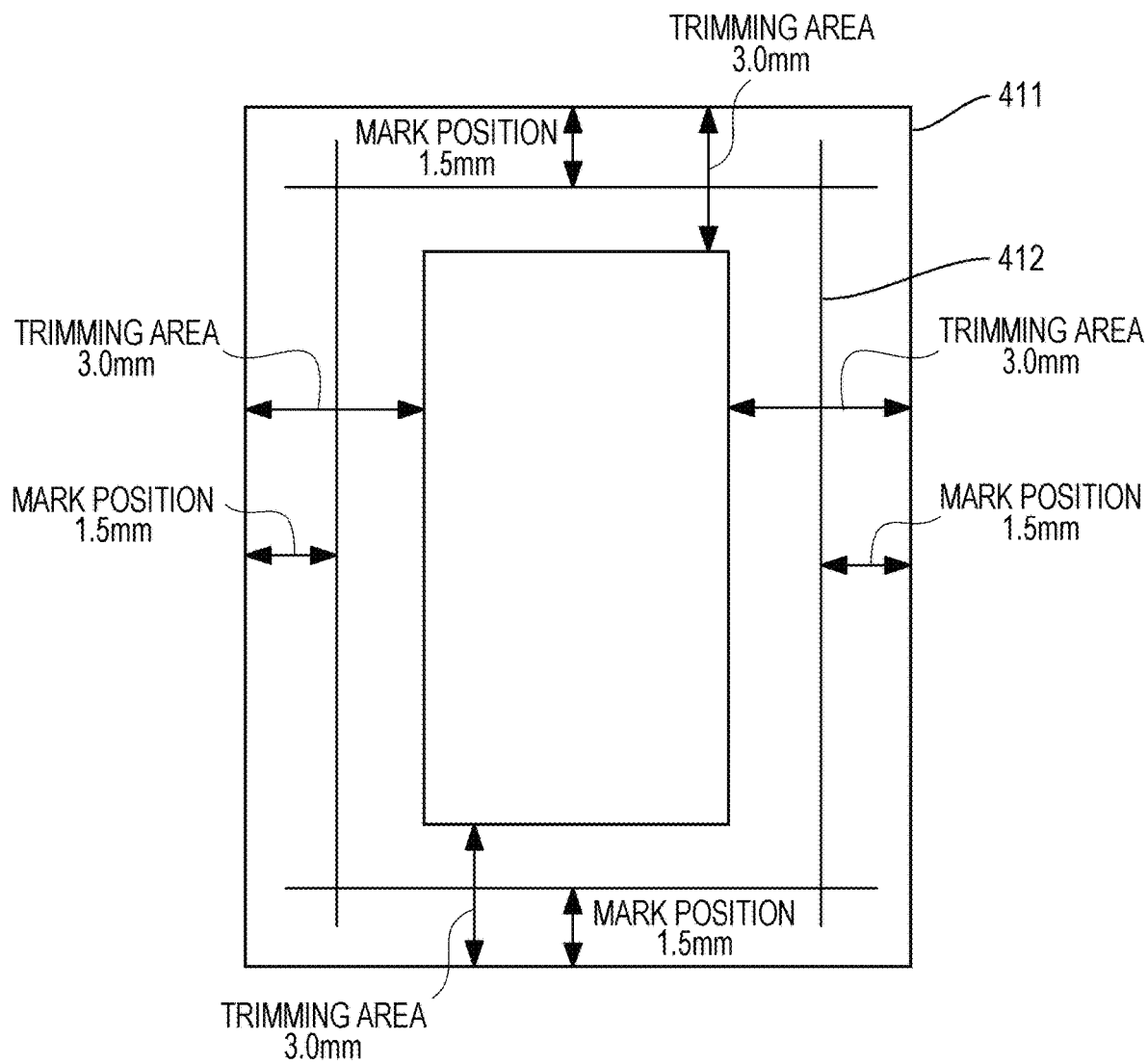
FIG. 16 is a plan view illustrating the trimming area of a foil stamping image.

FIG. 16 is a plan view illustrating the trimming area of a foil stamping image.

The trimming area where the foil stamping image is trimmed is set such that the image is not printed in the area where the register marks 412 are to be printed. In the example illustrated in FIG. 16, the trimming area covers 1.5 mm from the sheet edges 411 where the register marks 412 are formed, and also covers another 1.5 mm from the positions of the register marks 412. That is, in the example illustrated in FIG. 16, the area that covers 3.0 mm from the sheet edges 411 is set as a trimming area. Such a trimming area has only to be wider than the area where the register marks 412 are to be printed, and is not limited to the example illustrated in FIG. 16.

For trimming, for example, a part of the image data in the target page is deleted (converted into white data). As another way of trimming, a duplicate of the target page may be made such that a part of the target page (the area where the register marks 412 are to be printed) becomes blank.

Figure 17:
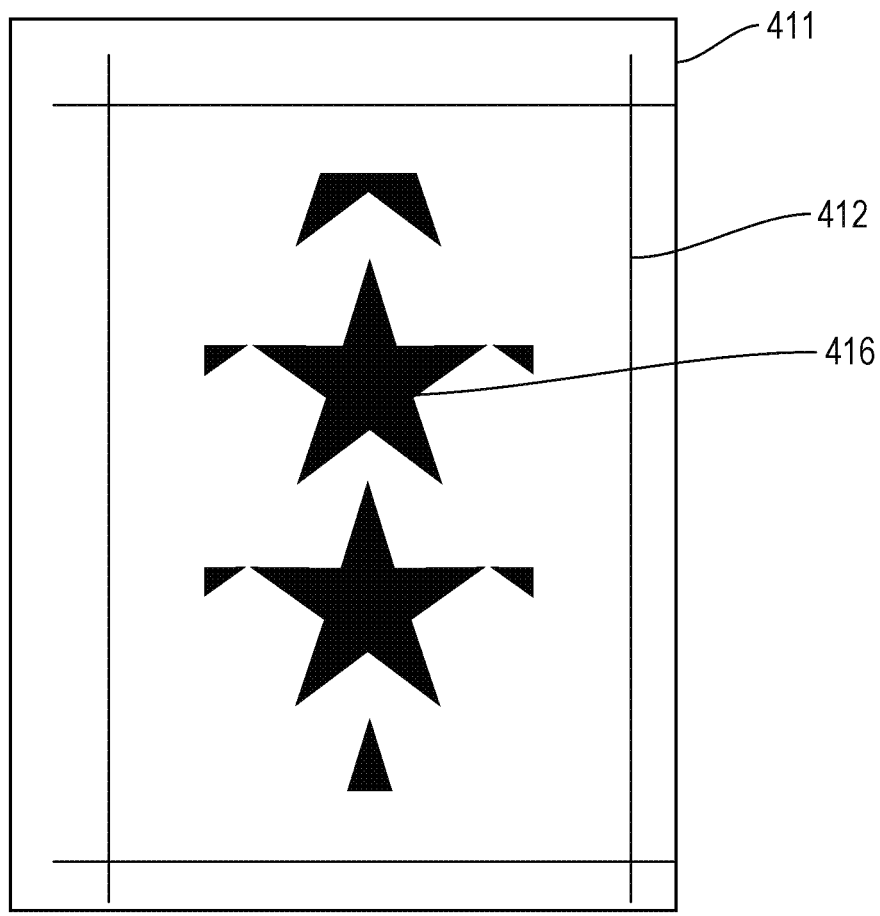
FIG. 17 is a plan view illustrating a sheet having register marks printed on a trimmed foil stamping image.

FIG. 17 is a plan view illustrating a sheet having register marks printed on a trimmed foil stamping image.

The foil stamping image illustrated in FIG. 17 is obtained by trimming the foil stamping image illustrated in FIG. 14. The trimming area is the area illustrated in FIG. 16. In the example illustrated in FIG. 17, after the trimmed image 416 is printed, the register marks 412 are printed. The register marks 412 are printed only once on the page having the trimmed image during overprinting. At this time, the overprinting image is not printed. Accordingly, on this page, even though the register marks 412 are printed after the foil stamping image is printed, the register marks 412 do not overlap the trimmed image 416. Therefore, the register marks 412 printed on this page can be reliably read by the FNS scanner 16.

From the read register marks 412, the distances between the positions of the register marks 412 and the sheet edges 411 are measured and compared with the ideal ones, whereby sheet shrinkage is detected.

After that, the detected shrinkage of the sheet is corrected, and the printing of the overprinting job is executed. When the printing of the overprinting job is executed, the register marks 412 may not be printed.

The image to be trimmed may be the image of any page in one job. In the present embodiment, the image of the first page or the image with the page number input for forced trimming is used, in the manner already described. In the present embodiment, such a page containing the foil stamping image to be trimmed is referred to as a target page. Then, in the present embodiment, a duplicate of the target page is made, and the foil stamping image in the duplicate of the target page is trimmed. Therefore, in the present embodiment, no image data other than those of the job are required to obtain an image that does not overlap the register marks 412.

Some foil stamping jobs may contain a page in which no image originally exists in the area where the register marks 412 are to be printed. In the present embodiment, such a page that does not require trimming is searched for as a target page in the job, and a duplicate of the page is made, in the manner already described. Still, in the present embodiment, no image data other than those of the job are required to obtain an image that does not overlap the register marks 412.

Figure 18:
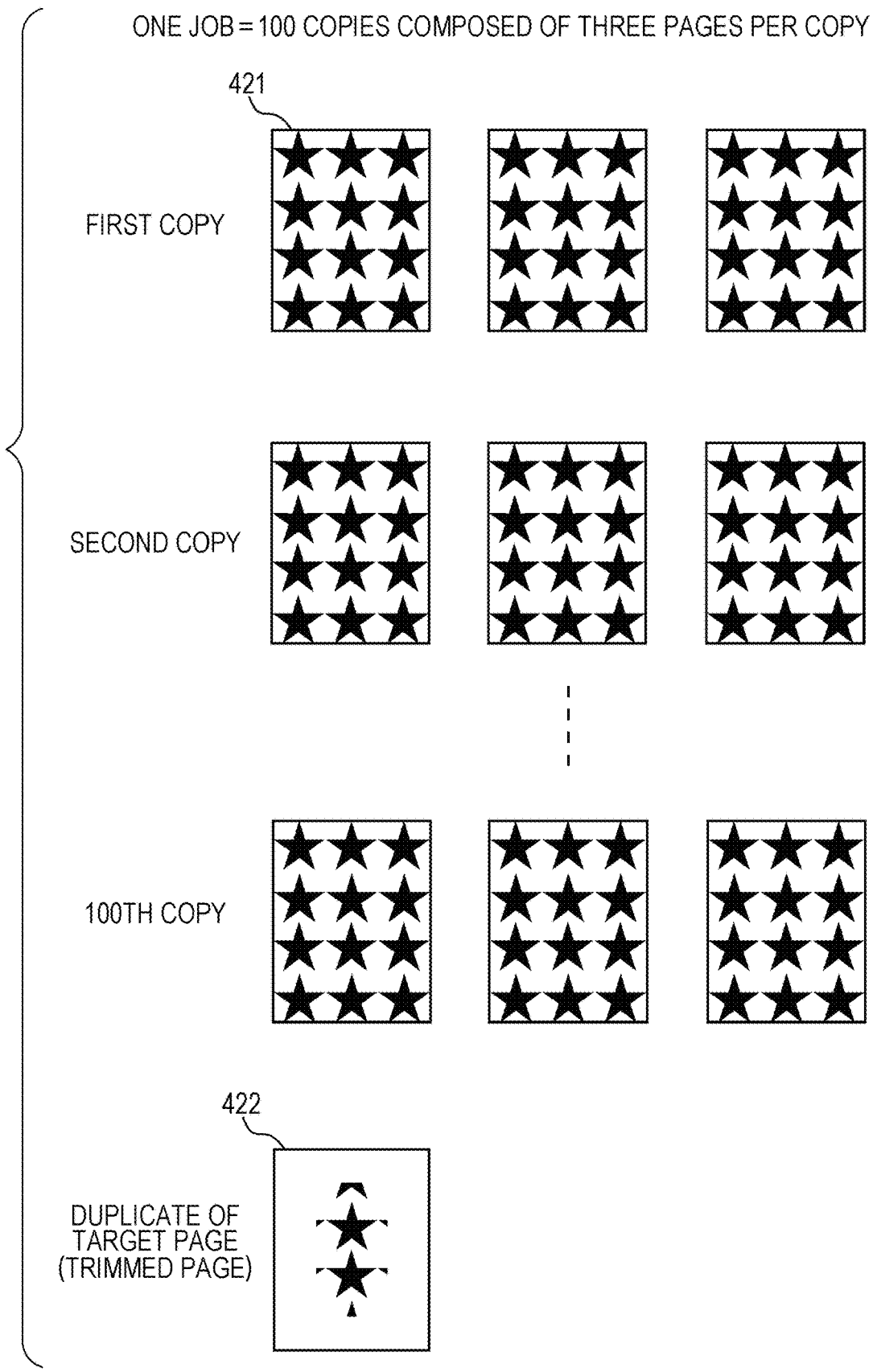
FIG. 18 is an explanatory diagram for explaining a first printing example in which a duplicate of a target page is printed together with the job.

FIG. 18 is an explanatory diagram for explaining a first printing example in which a duplicate of a target page is printed together with the job.

In the first printing example illustrated in FIG. 18, 100 copies of a printed matter composed of three pages per copy are printed as one job. The image of each page 421 in one copy is configured to overlap the print area of register marks. Therefore, in the first printing example, a duplicate of any one page is made, and the image is trimmed in the duplicate of the target page. As for printing, after the one job is printed, the page having the trimmed image is printed as the duplicate of the target page 422. Note that the duplicate of the target page 422 may be printed at the head of the job.

Figure 19:
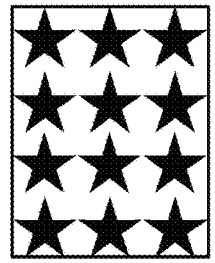
FIG. 19 is an explanatory diagram for explaining a second printing example in which a duplicate of a target page is printed together with the job.
Figure 19:
Figure 19:
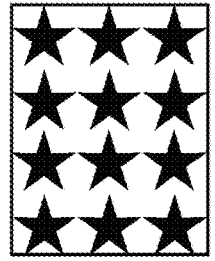
Figure 19:
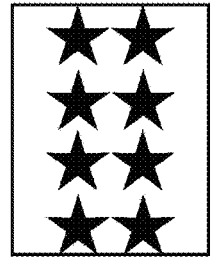
Figure 19:
Figure 19:
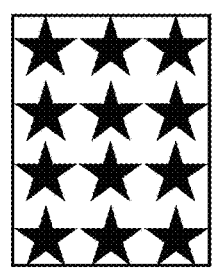
Figure 19:
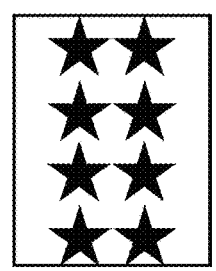
Figure 19:
Figure 19:
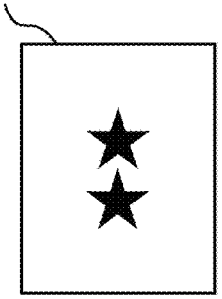

FIG. 19 is an explanatory diagram for explaining a second printing example in which a duplicate of a target page is printed together with the job.

In the second printing example illustrated in FIG. 19, 100 copies of a printed matter composed of three pages per copy are printed as one job. Among the images on the pages in one copy, the image on ore page 431 does not overlap the print area of register marks. Therefore, in the second printing example, a duplicate of the page 431 is made. As for printing, after the one job is printed, the page 431 in which the image originally does not overlap the print area of register marks is duplicated as it is and printed as a duplicate of the target page 432. Note that the duplicate of the target page 432 may be printed at the head of the job.

Next, the printing order of a duplicate of a target page will be described.

Figure 20:
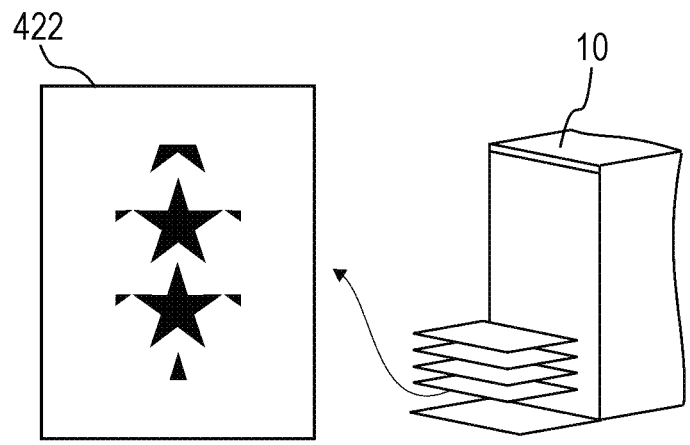
FIG. 20 is a schematic diagram illustrating a first output example of a foil stamping job printed by the image forming apparatus.

FIG. 20 is a schematic diagram illustrating a first output example of a foil stamping job printed by the image forming apparatus.

The first output example depicts the case where a duplicate of a target page is printed at the head of the foil stamping job. In the first output example, as illustrated in FIG. 20, the duplicate of the target page is located at the bottom of the stack of sheets output from the image forming apparatus 10. The stack of sheets is then carried to the foil stamping apparatus 20 and subjected to foil stamping. As a result, the duplicate of the target page is located at the top of the stack of sheets. Then, the stack of foil-stamped sheets is set in the image forming apparatus 10 as it is, and the duplicate of the target page is supplied to the image forming apparatus 10 first. Therefore, the first output example is advantageous in that the first-supplied page can directly undergo printing of register marks so that the adjustment of the position and size of the image can be executed.

In the first output example, foil stamp printing by the image forming apparatus 10, foil stamping by the foil stamping apparatus 20, and overprinting by the image forming apparatus 10 can be performed as a series of operations, without taking out the duplicate of the target page or changing positions in the stack of sheets.

Figure 21:
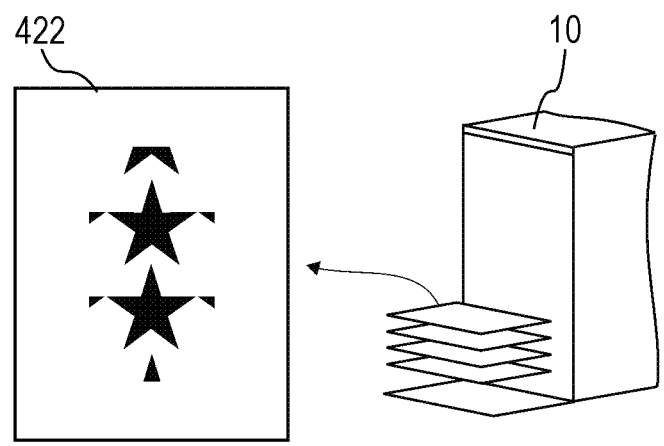
FIG. 21 is a schematic diagram illustrating a second output example of a foil stamping job printed by the image forming apparatus.

FIG. 21 is a schematic diagram illustrating a second output example of a foil stamping job printed by the image forming apparatus.

The second output example depicts the case where a duplicate of a target page is printed at the end of the foil stamping job. In the second output example, as illustrated in FIG. 21, the duplicate of the target page is located at the top of the stack of sheets output from the image forming apparatus 10. This makes it easy to notice that the duplicate of the target page exists in the foil stamping job.

In the second output example, because the duplicate of the target page is located at the top of the stack of sheets after the foil stamping job is printed, it is easy to takeout only the duplicate of the target page. Foil is usually more expensive than toner. Therefore, the second output example is advantageous in reducing the cost by not performing foil stamping on the duplicate of the target page.

An embodiment of the present invention has been described so far, but various modifications are possible.

In the embodiment described above, one duplicate of a target page is printed together with the foil stamping job. Alternatively, multiple duplicates of a target page may be printed together with the foil stamping job. In addition, a plurality of pages may be selected as target pages from the foil stamping job and printed together with the foil stamping job.

An image adjustment mark is not limited to a register mark. As an image adjustment mark, for example, a color patch for color adjustment can be used. Alternatively, an image adjustment mark may be, for example, a dedicated mark for adjusting an image to be printed during overprinting.

The conditions, numerical values, etc. used in the description of the embodiment are for explanation only, and the present invention is not limited to these conditions and numerical values.

The present invention can be modified in various ways on the basis of the configurations described in the claims, and these are also within the scope of the present invention.

According to an embodiment of the present invention, a duplicate of at least one page of a job for printing a foil stamping image is made, the image on the duplicate of the page is trimmed such that the image does not overlap an image adjustment mark for adjusting an image for overprinting, and the trimmed image is printed together with the job. Then, according to an embodiment of the present invention, the image adjustment mark is printed on the page having the trimmed image printed thereon, so that the image adjustment mark for correcting the image for overprinting can be prevented from overlapping the foil stamping image.

According to an embodiment of the present invention, a page containing an image that does not overlap an image adjustment mark for adjusting an image for overprinting is selected from a job for printing a foil stamping image, and a duplicate of the page is made and printed together with the job. Then, according to an embodiment of the present invention, the image adjustment mark is printed on the page having the image that does not overlap ti image adjustment mark printed thereon, so that the image adjustment mark for correcting the image for overprinting can be prevented from overlapping the foil stamping image.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
    an image former that prints a foil stamping image on a recording material in accordance with a job for printing the foil stamping image, the foil stamping image being a target to which foil is transferred in foil stamp printing; and
    a hardware processor that trims an image on a page identical to at least ore page included in the job such that the image on the identical page does not overlap an image adjustment mark that is printed for adjusting an image to be overprinted, and causes the image former to print, together with the job, the identical page having the trimmed image.

2. The image forming apparatus according to claim 1, wherein
    the image adjustment mark is a register mark, and
    the hardware processor sets an area wider than an area where the register nark is printed as a trimming area where an image is not formed.

3. An image forming apparatus comprising:
    an image former that prints a foil stamping image on a recording material in accordance with a job for printing the foil stamping image, the foil stamping image being a target to which foil is transferred in foil stamp printing; and
    a hardware processor that makes, from the job, a duplicate of a page having an image that does not overlap an image adjustment mark that is printed for adjusting an image to be overprinted, and causes the image former to print, together with the job, the duplicate of the page having the image that does not overlap the image adjustment mark.

4. The image forming apparatus according to claim 3, wherein
    in a case where the job does not include a page having an image that does not overlap the image adjustment mark, the hardware processor makes a duplicate of at least one page in the job, trims an image on the duplicate of the page such that the image on the duplicate of the page does not overlap the image adjustment mark that is printed on the duplicate of the page, and causes the image former to print, together with the job, the duplicate of the page having the trimmed image.

5. The image forming apparatus according to claim 3, wherein
    the hardware processor causes the duplicate of the page to be printed at a head or end of the job.

6. An image forming method comprising:
    trimming an image on a page identical to at least one page included in a job for printing a foil stamping image, the foil stamping image being a target to which foil is transferred in foil stamp printing, such that the image on the identical page does not overlap an image adjustment mark that is printed for adjusting an image to be overprinted;
    printing, on a recording material together with the job, the identical page having the trimmed image;
    performing foil stamping using a foil stamping apparatus on the recording material having the foil stamping image printed;
    printing the image adjustment mark on the recording material having the identical page laving the trimmed image printed; and
    performing overprinting on the recording material subjected to the foil stamping after image adjustment is performed using the image adjustment mark.

7. An image forming method comprising:
    making, from a job for printing a foil stamping image, the foil stamping image being a target to which foil is transferred in foil stamp printing, a duplicate of a page having an image that does not overlap an image adjustment nark that is printed for adjusting an image to be overprinted;
    printing, on a recording material together with the job, the duplicate of the page laving the image that does not overlap the image adjustment mark;
    performing foil stamping using a foil stamping apparatus on the recording material having the foil stamping image printed;
    printing the image adjustment mark on the recording material of the duplicate of the page; and
    performing overprinting on the recording material subjected to the foil stamping after image adjustment is performed using the image adjustment mark.

8. A non-transitory recording medium storing a computer readable image forming program for causing a computer to execute:
    trimming an image on a page identical to at least one page included in a job for printing a foil stamping image, the foil stamping image being a target to which foil is transferred in foil stamp printing, such that the image on the identical page does not overlap an image adjustment mark that is printed for adjusting an image to be overprinted; and causing the identical page having the trimmed image to be printed on a recording material together with the job.

9. A non-transitory recording medium storing a computer readable image forming program for causing a computer to execute:

making, from a job for printing a foil stamping image, the foil stamping image being a target to which foil is transferred in foil stamp printing, a duplicate of a page having an image that does not overlap an image adjustment mark that is printed for adjusting an image to be overprinted; and causing the duplicate of the page having the image that does not overlap the image adjustment mark to be printed on a recording material together with the job.

* * * * *